US005560769A

United States Patent [19]
Conner et al.

[11] Patent Number: 5,560,769
[45] Date of Patent: Oct. 1, 1996

[54] WATER-BASED CERAMIC MARKING INK FOR MARKING METAL SURFACES AND METHOD USING SAME

[75] Inventors: Bernard J. Conner; Timothy B. Conner, both of Cincinnati, Ohio

[73] Assignee: Advanced Technical Products Supply Co., Inc., Cincinnati, Ohio

[21] Appl. No.: 530,945

[22] Filed: Sep. 20, 1995

[51] Int. Cl.$^6$ ............................................. C09D 1/00
[52] U.S. Cl. ........................... 106/19 R; 106/286.8; 106/286.5; 106/287.29
[58] Field of Search .......................... 106/19 R, 20 R, 106/286.8, 286.5, 287.29

[56] References Cited

U.S. PATENT DOCUMENTS

| | | | |
|---|---|---|---|
| 3,836,380 | 9/1974 | Kramer | 117/6 |
| 3,839,078 | 10/1974 | Birchall et al. | 117/119.6 |
| 3,908,066 | 9/1975 | Parkinson | 428/379 |
| 3,930,876 | 1/1976 | Nakajima et al. | 106/74 |
| 4,047,977 | 9/1977 | Yoshida et al. | 148/6.2 |
| 4,230,500 | 10/1980 | Balducci et al. | 106/288 B |
| 4,238,534 | 12/1980 | Ichida et al. | 427/376.5 |
| 4,269,879 | 5/1981 | Davis | 428/36 |
| 4,281,035 | 7/1981 | Hawthorne et al. | 106/19 R |
| 4,435,219 | 3/1984 | Greigger | 106/287.16 |
| 4,443,264 | 4/1984 | Hund et al. | 106/292 |
| 4,496,399 | 1/1985 | Haselkorn | 148/6.15 R |
| 4,505,954 | 3/1985 | Hokamura et al. | 427/380 |
| 4,506,999 | 3/1985 | Robertson | 400/121 |
| 4,511,524 | 4/1985 | Nemeth et al. | 264/61 |
| 4,581,395 | 4/1986 | Nakaya et al. | 523/410 |
| 4,680,457 | 7/1987 | Robertson | 235/470 |
| 4,711,666 | 12/1987 | Chapman et al. | 106/14.12 |
| 4,741,775 | 5/1988 | Holcombe, Jr. et al. | 106/20 |
| 4,769,074 | 9/1988 | Holcombe, Jr. et al. | 106/14.12 |
| 4,806,741 | 2/1989 | Robertson | 235/462 |
| 4,808,018 | 2/1989 | Robertson et al. | 400/121 |
| 4,810,300 | 3/1989 | Holcombe, Jr. et al. | 106/86.1 |
| 4,834,798 | 5/1989 | Cisar et al. | 106/14.12 |
| 4,870,922 | 10/1989 | Robertson | 118/702 |
| 4,883,291 | 11/1989 | Robertson | 283/117 |
| 4,898,618 | 2/1990 | Holcombe, Jr. et al. | 106/287.34 |
| 4,985,715 | 1/1991 | Cyphert et al. | 346/140 R |
| 5,015,106 | 5/1991 | Robertson et al. | 400/121 |
| 5,055,137 | 10/1991 | Holcombe, Jr. et al. | 106/600 |
| 5,066,330 | 11/1991 | Holcombe, Jr. et al. | 106/287.34 |
| 5,119,109 | 6/1992 | Robertson | 346/1.1 |
| 5,167,457 | 12/1992 | Cyphert et al. | 400/121 |
| 5,298,059 | 3/1994 | Takimoto et al. | 106/14.17 |

FOREIGN PATENT DOCUMENTS

| | | |
|---|---|---|
| 070230 | 6/1976 | Japan . |
| 120013 | 10/1977 | Japan . |
| 155263 | 9/1982 | Japan . |

OTHER PUBLICATIONS

Automatic Coil Marking, InfoSight Corporation, (6 pages), no date available.
Automatic Marking, InfoSight Corporation, (6 pages), no date available.

*Primary Examiner*—Helene Klemanski
*Attorney, Agent, or Firm*—Standley & Gilcrest

[57] ABSTRACT

Compositions of the present invention are water-based ceramic marking inks that include: (a) at least one source of phosphate; (b) at least one inorganic colorant; and (c) a sufficient of water to render said composition to a liquid form. The present invention also includes a method for making metal surfaces using such inks.

24 Claims, No Drawings

WATER-BASED CERAMIC MARKING INK FOR MARKING METAL SURFACES AND METHOD USING SAME

BACKGROUND

In the metals industry, it is often desirable to be able to mark the surface of newly rendered metal pieces for identification purposes.

In order to avoid possible confusion as to the identity of freshly rendered metal pieces (such as slabs, coils, plates, blooms, rounds, pipes, billets, bars and structural members), it is most desirable to be able to mark such pieces even when they are still hot from rendering or working operations.

One of the methods of marking new metal pieces is to do so with non-contact methods involving marking inks. Naturally, their are problems associated with the use of marking inks on metal surfaces that are at temperatures measured in thousands of degrees. Such surfaces are highly reactive to certain chemical species, and it is often difficult to have inks adhere to such surfaces without being subject to flaking off particularly upon cooling, causing the metal surface to lose its identification. For this same reason, it is desirable that the inks be weatherable over rather long periods of time (i.e., up to three years) as metal products are often exposed to the elements.

Inks of this general type should have high visibility and legibility, so that they may be easily read from the metal surface, even when soiled or partially corroded. It is also advantageous that such inks have good impact resistance, abrasion resistance, thermal shock resistance and workability characteristics.

Also, because such inks must be amenable to application by automated spray equipment, it is also advantageous to create such inks that offer appropriate flow characteristics so as to be applicable through spray jets. It is also advantageous to produce inks that may be use with laser marking machines to form a background coating for laser marking.

In order to solve these problems, it was desired to create a water-based ceramic marking ink to offer the metals and other industries materials that can be used to identify metals and other materials at ambient temperatures as well as temperatures in excess of 2300° F.

The invention covers an advanced group of ceramic inks formulated to adhere to metals and other materials over a wide range of temperatures. The inks can be sprayed, brushed or flow coated to the various substrates. The inks will dry to a hard, legible and durable identification or coating that will accept laser markings or other markings. The present invention may be used with the technologies described in U.S. Pat. Nos. 5,055,137 and 4,741,775 to Holcombe, Jr., et al.; U.S. Pat. Nos. 4,883,291 and 5,119,109 to Robertson; and U.S. Pat. No. 4,985,715 to Cyphert et al.; all of which are incorporated herein by reference.

In view of the present disclosure or through the practice of the invention, other advantages may become apparent.

SUMMARY OF THE INVENTION

In broadest terms, the compositions of the present invention include: (a) at least one source of phosphate; (b) at least one inorganic colorant; and (c) a sufficient amount of water to render said composition to a liquid form.

Unless otherwise specified, all percent compositions given herein are considered to be expressed as percent by weight of the total marking composition.

The source of phosphate is selected from the group consisting of mono-magnesium phosphate, mono-aluminum phosphate, phosphoric acid, modified aluminum phosphate, mono-ammonium phosphate, boron phosphate, sodium-silico phosphate, sodium polyphosphate, and alkali phosphates, and mixtures thereof. The phosphate(s) may be present in a total amount of from about 10% to about 80% by weight of the marking composition, with 20% to about 40% by weight being the preferred amount.

The preferred source of phosphate is mono-ammonium phosphate.

The inorganic colorant may be selected from the group consisting of titanium dioxide, kaolin and calcines alumina, and mixtures thereof. The colorant(s) may be present in a total amount of from about 5% to about 80% by weight of the marking composition, with 20% to about 40% by weight being the preferred amount.

The marking compositions may also include at least one suspending agent, such as those selected from the group consisting of xanathan gum, bentonite, kaolin clay and magnesium silicate, or mixtures thereof. The suspending agent(s) may be present in a total amount of at least 0.5% by weight of the marking composition, with 0.5% to about 3% by weight being the preferred amount.

Where used with laser marking applications, it is preferred that the marking composition additionally contain mica.

The present invention also includes a method of marking a metal surface, the method comprising the basic steps of: (a) obtaining a metal surface (such as a metal surface from metal rendering operations); and (b) applying to the metal surface a marking according to the present invention as described above.

The method of the present invention may be used to apply the marking composition in a pattern forming indicia such as numbers, letters and combinations thereof. The present method may also be used to apply a pattern forming bar codes.

The marking composition may be applied by spraying using commercial spraying equipment.

The method of the present invention may also be used with laser marking subsequent to the application of the marking composition to the metal surface. The marking composition once applied to the metal surface will dry, allowing a laser to mark the surface of the dried marking composition. As used herein, it will be understood that when a hot metal surface is used, the hot metal surface is at a temperature in the range of 200° F. to 2350° F.

The water-based ceramic marking inks are formulated from titanium dioxide, minerals, ceramics, glasses, phosphates, borates, suspending agents, thickeners, and water. The formulations can vary over a wide range of percentages depending on the specific applications, as evidenced by the specific examples given below. The marking inks in accordance with the present invention have exceptional properties which include:

Bonding range from ambient to 2300° F.

Weathering resistance in excess of three years.

Excellent thermal shock resistance.

Exceptional visibility and legibility.

Exceptional impact resistance.

Higher abrasive resistance.

Excellent workability.

Ability to accept laser markings.

In the steel industry the new ceramic ink can be used to identify slabs, billets, plates, coils, pipe, ingots and other products during the manufacturing processes. The ceramic inks can also be used in other industries to identify materials at various temperatures (i.e., ambient to 2300° F.). In metal rendering operations, hot metal surfaces to which the inventive compositions may be applied may be at temperatures in the range of 200° F. to 2350° F.

The new ceramic inks offer the metals industry a reliable material to identify metals. The ceramic inks can be used to form a background coating for laser marking, a marking or a group of markings to form clear identifications.

The water-based ceramic inks can be applied by various methods. The inks can be sprayed, brushed or flow coated. The systems include simple conventional air spray systems and sophisticated computer controlled application systems. Airless spray units can be used as well as air assisted. The inks can be used to make dots as in a dot matrix system to form numbers and letters or used to make a background area so that markings can be applied to the coated area with a laser marking system or other marking technology. Examples of automatic marking machines using spray application are those commercially available from InfoSight Corporation of Chillicothe, Ohio and sold under the I-Dent® and Telesis® trademarks.

The bonding properties of a large number of phosphate and borate minerals used to bond refractories has been known for many years. However, the use of phosphates and borates to adhere to metals and other materials as coatings or inks has not been used. The use of the following phosphates has produced coatings/inks with unique properties. These inks/coatings have been found to adhere to metals as well as to accept marking from lasers and other equipment. The use of ceramic pigments also allows the production of inks with various colors ranging from bright whites to yellows, greens, blues and other environmentally and user friendly colors. Such colorants include titanium dioxide, kaolin and calcines alumina, or mixtures thereof.

The following phosphate materials may be used to produce quality ceramic marking inks: mono-magnesium phosphate, mono-aluminum phosphate, phosphoric acid, modified aluminum phosphate, mono-ammonium phosphate, boron phosphate, sodiumsilico phosphate, sodium polyphosphate and alkali phosphates, or mixtures of any of the foregoing.

The compositions of the present invention may optionally include suspending agents such as kaolin clays, bentonite and sodium pentaborate.

The compositions of the present invention may also contain sodium silicate and potassium silicates, powdered opacified glasses, alumina, mullite and silica.

The use of phosphates in a metal marking composition has also been found to make the coating produced thereby particularly amenable to laser marking. Another optional substance that has been found to make the coating especially amenable to laser marking is mica. Both of these substances have been found to produce especially dark markings when subjected to laser marking (by laser irradiation), making them particularly easy to read as in the case of a bar code reader. The preferred amount of mica in the disclosed compositions may be in the range of from about 5% to about 20% by weight. Laser marking equipment which may be used in the present invention may also be commercially obtained from InfoSight Corporation of Chillicothe, Ohio.

The water-based ceramic marking inks may also be formulated from minerals, ceramics, glasses, phosphates, borates, suspending agents, thickeners, and water. The formulations can vary over a wide range of percentages depending on the specific applications.

DETAILED DESCRIPTION OF THE PREFERRED EMBODIMENT

In accordance with the foregoing summary of the invention, the following presents examples of the preferred embodiment of the present invention.

The following examples are formulations were tested on stainless steels, high carbon grades, alloy and other grades. The marking inks were applied to steel at ambient, 500° F., 1000° F., 1500° F. and 2350° F.

EXAMPLE #1

Bright white (ambient to 2350° F.) with laser marking capabilities.

| | |
|---|---|
| Titanium Dioxide | 30% |
| Mono aluminum Dioxide | 30% |
| Magnesium Silicate | 2% |
| Water | 38% |

EXAMPLE #2

Bright White (ambient to 2350° F.) with laser marking capabilities.

| | |
|---|---|
| Titanium Dioxide | 30% |
| Mono ammonium Phosphate | 30% |
| Magnesium Silicate | 2% |
| Water | 38% |

EXAMPLE #3

Bright White (ambient to 2350° F.) with laser marking capabilities.

| | |
|---|---|
| Titanium Dioxide | 30% |
| Mono Magnesium phosphate | 30% |
| Magnesium Silicate | 2% |
| Water | 38% |

EXAMPLE #4

Bright White (ambient to 2350° F.) with laser marking capabilities.

| | |
|---|---|
| Titanium Dioxide | 30% |
| Boron Phosphate | 30% |
| Magnesium Silicate | 2% |
| Water | 38% |

EXAMPLE #5

Bright White (ambient to 2350° F.) with laser marking capabilities.

| | |
|---|---|
| Titanium Dioxide | 30% |
| Mono aluminum Phosphate | 30% |
| Sodium Pentaborate | 5% |
| Magnesium Silicate | 2% |
| Water | 33% |

EXAMPLE #6

Bright White (ambient to 2350° F.) with laser marking capabilities.

| | |
|---|---|
| Titanium Dioxide | 30% |
| Phosphoric Acid | 10% |
| Magnesium Silicate | 2% |
| Water | 58% |

EXAMPLE #7

Off-White (ambient to 2350° F.) with laser marking capabilities.

| | |
|---|---|
| Kaolin | 30% |
| Mono ammonium Phosphate | 30% |
| Magnesium Silicate | 2% |
| Water | 38% |

EXAMPLE #8

Bright White color (ambient to 2350° F.) with laser marking capabilities.

| | |
|---|---|
| Titanium Dioxide | 10% |
| Sodium Metal Phosphate | 35% |
| Xanathan Gum | 2% |
| Water | 53% |

EXAMPLE #9

Off White (ambient to 2350° F.) with laser marking capabilities.

| | |
|---|---|
| Kaolin | 30% |
| Mono Ammonium Phosphate | 30% |
| Yellow Pigment | 5% |
| Magnesium Silicate | 1% |
| Water | 34% |

The formulations can vary over a wide percentage depending on the specific application. The consistency of the inks will vary from 200 cps to over 200,000 cps. The specific gravity can vary from 1.10 to 1.80 depending on the application. The pH of the marking inks may range from 1 to 12 depending on the type of phosphate selected for the bonding characteristics.

The preferred formulations are as follows:

FORMULA # 1

| | |
|---|---|
| Titanium Dioxide | 30% |
| Mono Ammonium Phosphate | 30% |
| Water | 39% |
| Magnesium Silicate | 1% |

FORMULA # 2

| | |
|---|---|
| Titanium Dioxide | 30% |
| Mono Aluminum Phosphate | 30% |
| Water | 39% |
| Magnesium Silicate | 1% |

Range of formulations representing general components:

| MATERIALS | RANGES | MANUFACTURERS |
|---|---|---|
| Titanium Dioxide | 5 to 80% | Kronos, Inc. |
| Magnesium Silicate | 0 to 80% | Vanderbilt |
| Mono Aluminum Phosphate | 10 to 80% | Albright & Wilson Co. |
| Mono Ammonium Phosphate | 10 to 80% | Albright & Wilson Co. |
| Boron Phosphate | 10 to 80% | Cometals |
| Sodium Polyphosphate | 10 to 80% | Cometals |
| Alkali Phosphate | 10 to 80% | Cometals |

The ceramic marking inks of the present invention may be prepared by ball milling the ingredients in a porcelain lined ball mill using high density grinding balls. The coating may be milled to a fineness of 1% on a 325 mesh screen. Marking compositions of the present invention may be made simply by mixing the component compounds in a batch mixer. For instance, where the colorant may be placed in a batch mixer, such as a large drum supplied with a mechanical mixer, and stirred with the requisite amount of water. The resulting liquid is stirred for several minutes until uniform. The suspending agent may also be added at this stage. The phosphate component is then added and stirring is continued to reach a uniform mixture. The mixture preferably is then screened such as with a 150 mesh screen prior to dispensing. The composition may then be adjusted to a viscosity using various known thickeners.

In light of the foregoing disclosure, it will be within the ability of one skilled in the chemical arts to make modifications to the present invention, such as through the substitution of equivalent materials, and/or the application of equivalent process steps, without departing from the spirit of the invention.

What is claimed is:

1. A marking composition for marking a metal surface, said composition comprising:
   (a) mono-ammonium phosphate present in an amount of from about 10% to about 80% by weight of said marking composition;
   (b) at least one inorganic colorant present in an amount of from about 5% to about 80% by weight of said marking composition; and
   (c) a sufficient amount of water to render said composition to a liquid form.

2. A marking composition according to claim 1 wherein mono-ammonium phosphate is present in a total amount of from about 20% to about 40% by weight.

3. A marking composition according to claim 1 additionally comprising at least one additional source of phosphate selected from the group consisting of mono-magnesium phosphate, mono-aluminum phosphate, phosphoric acid, modified aluminum phosphate, boron phosphate, sodium silico phosphate, sodium polyphosphate, and alkali phosphates.

4. A marking composition according to claim 1 wherein said at least one inorganic colorant is present in a total amount of from about 20% to about 40% by weight.

5. A marking composition according to claim 1 wherein said at least one inorganic colorant is selected from the group consisting of titanium dioxide, kaolin and calcines alumina, and mixtures thereof.

6. A marking composition according to claim 1 additionally comprising at least one suspending agent.

7. A marking composition according to claim 6 wherein said at least one suspending agent is present in a total amount of at least 0.5% by weight of said marking composition.

8. A marking composition according to claim 6 wherein said at least one suspending agent is present in a total amount of from about 0.5% to about 3% by weight.

9. A marking composition according to claim 4 wherein said at least one suspending agent is selected from the group consisting of xanathan gum, bentonite, kaolin clay and magnesium silicate, and mixtures thereof.

10. A marking composition according to claim 1 additionally comprising mica.

11. A method of marking a metal surface comprising:
   (a) obtaining a metal surface;
   (b) applying to said metal surface a marking composition comprising:
      (i) at least one source of phosphate present in an amount of from about 10% to about 80% by weight of said marking composition;
      (ii) at least one inorganic colorant present in an amount of from about 5% to about 80% by weight of said marking composition; and
      (iii) a sufficient amount of water to render said composition to a liquid form; and
   (c) drying said marking composition onto said metal surface and subsequently subjecting said marking composition to laser marking.

12. A method according to claim 11 wherein said at least one source of phosphate is present in a total amount of from about 20% to about 40% by weight.

13. A method according to claim 11 wherein said at least one source of phosphate is selected from the group consisting of mono-magnesium phosphate, mono-aluminum phosphate, phosphoric acid, modified aluminum phosphate, mono-ammonium phosphate, boron phosphate, sodium-silico phosphate, sodium polyphosphate, and alkali phosphates.

14. A method according to claim 11 wherein said at least one source of phosphate is mono-ammonium phosphate.

15. A method according to claim 11 wherein said at least one inorganic colorant is present in a total amount of from about 20% to about 40% by weight.

16. A method according to claim 11 wherein said at least one inorganic colorant is selected from the group consisting of titanium dioxide, kaolin and calcines alumina, and mixtures thereof.

17. A method according to claim 11 additionally comprising at least one suspending agent.

18. A method according to claim 17 wherein said at least one suspending agent is present in a total amount of at least 0.5% by weight of said marking composition.

19. A method according to claim 17 wherein said at least one suspending agent is present in a total amount of from about 0.5% to about 3% by weight.

20. A method according to claim 17 wherein said at least one suspending agent is selected from the group consisting of xanathan gum, bentonite, kaolin clay and magnesium silicate, and mixtures thereof.

21. A method according to claim 11 additionally comprising mica.

22. A method according to claim 11 wherein said marking composition is applied in a pattern forming indicia selected from the group consisting of numbers, letters, bar codes and combinations thereof.

23. A method according to claim 11 wherein said marking composition is applied by spraying.

24. A method according to claim 11 wherein said metal surface is at a temperature in the range of 200° F. to 2350° F.

* * * * *